United States Patent [19]

Schoeneweis et al.

[11] Patent Number: 4,619,283
[45] Date of Patent: Oct. 28, 1986

[54] STEM SEAL FOR TAPERED LUBRICATED PLUG VALVES

[75] Inventors: E. Frederick Schoeneweis, Coraopolis; Donn W. Duffey, Pittsburgh, both of

[73] Assignee: Rockwell International Corporation, Pittsburgh, Pa.

[21] Appl. No.: 822,441

[22] Filed: Jan. 27, 1986

[51] Int. Cl.[4] ............... F16K 41/00; F16K 43/00
[52] U.S. Cl. .................. 137/15; 137/246.19; 251/214; 251/160; 277/27
[58] Field of Search .............. 137/15, 315, 246.11, 137/246.12, 246.13, 246.14, 246.15, 246.17, 246.18, 246.19, 246.2, 246.21, 246.22; 251/159, 160, 214; 277/27, 165, 180

[56] References Cited

U.S. PATENT DOCUMENTS

| | | | |
|---|---|---|---|
| 1,572,030 | 2/1926 | Nordstrom | 137/246.18 |
| 1,890,524 | 12/1932 | Martin, Jr. | 137/246.18 |
| 2,100,470 | 11/1937 | Cotton | 137/246.15 |
| 2,699,916 | 1/1955 | Johnson | 137/246.16 |
| 2,715,412 | 8/1955 | Clade | 137/246.17 |
| 2,718,665 | 9/1955 | Clade | 137/246.15 |
| 2,945,668 | 7/1960 | Staller et al. | 137/246.19 |
| 4,159,818 | 7/1979 | Hoos | 251/214 |

*Primary Examiner*—George L. Walton

[57] ABSTRACT

A method of forming a stem seal and controlling the sealant film thickness in a lubricated plug valve in which a deformable ring is inverted in an annular space between the stem, the valve cover and the top of the plug and the ring is deformed into sealing engagement with the plug, the stem and cover by applying pressure to the sealant system of the valve during assembly.

4 Claims, 3 Drawing Figures

STEM SEAL FOR TAPERED LUBRICATED PLUG VALVES

FIELD OF THE INVENTION

This invention relates to a method and apparatus for providing a combined stem seal and plug adjustment arrangement for preventing leakage from the interior of a lubricated tapered plug valve along the stem to the exterior of the valve and for ideally locating the plug axially with respect to the body tapered bore.

BACKGROUND OF THE INVENTION AND DESCRIPTION OF THE PRIOR ART

Plug valves have long been known in the prior art as an effective means of controlling the flow of fluid in pipelines. In some cases the closure member is cylindrical in form and mates with a similarly shaped seat within the body of the valve. In other cases the plug is of tapered form and fits within a similarly tapered bore within the body. Also in some cases, the plug is in metal-to-metal contact with the tapered bore while in other cases a film of lubricant/sealant (hereinafter "sealant") is interposed between the surface of the plug and the tapered bore to augment the sealing properties of the closure member of the plug and to minimize the amount of torque required to turn the valve between its open and closed position. In all cases, however, a valve stem which is connected to the plug extends through an opening in the housing to the exterior of the body so as to provide a means of rotating the plug between its open and closed position. This presents a possible leakage path from the interior of the body to the exterior.

Various means of sealing this leakage path have been proposed and utilized in the past. Typical of such seals are those shown in U.S. Pat. Nos. 1,932,322; 2,651,490, 2,699,916; 2,715,412; 2,718,665; 2,876,987; 2,945,668; and 4,159,818. In some cases such as in U.S. Pat. Nos. 1,932,322; 2,945,668; 2,876,987 and 2,651,490, the seal is provided between axially extending surfaces on the body of the valve and the plug. In others as shown in the U.S. Pat. Nos. 2,715,412 and 2,718,665 the seal is provided between radially extending surfaces at the top of the plug and on the body. In U.S. Pat. No. 2,718,665 a sealing ring of polytetrafluoroethelene is interposed between the top of a cylindrical plug and a radial surface on the body. During assembly pressure is applied axially to the plug to force the seal ring into a tapered groove in the top of the plug and to force it into close sealing contact with the groove and the body. In still other cases such as shown in U.S. Pat. Nos. 2,699,916 and 4,159,818, the seal is provided both on axially extending surfaces and on radially extending surfaces.

In all of these cases however, the sealing means employed or the method of providing the seal in the assembly is either relatively complicated and therefore expensive or is of doubtful effectiveness in providing an adequate seal. Moreover in lubricated tapered plug valves where a film of sealant is interposed between the plug and the tapered bore to enhance sealability and to reduce turning effort of the plug, it is desirable to control the clearance between the plug and body tapered bore which results as the plug moves axially out of the body tapered bore as a result of pressure on the sealant, to an optimum value. If the clearance is so great as to require a thick film of sealant, the sealant may be too easily forced out of the space between the plug and the body by line fluid pressure and into the fluid pipeline. At the same time, the method employed to control the clearance must not produce forces which would bias the plug axially inward toward the tapered bore creating interface pressure which could result in high frictional resistance between the plug and body causing the valve to be difficult to operate. Applicants have developed a means of providing an effective seal between the body and the stem and of providing during assembly a control of the clearance between the plug and the body tapered bore.

SUMMARY OF THE INVENTION

In Applicant's invention, during assembly of the tapered lubricated plug valve a deformable seal ring of polytetrafluoroethelene (PTFE), generally rectangular in cross section in its undeformed state, is inserted in an annular space of generally rectangular cross section formed between the bottom of the stem and the cover of the valve at the top of the plug. This space communicates with the let-in clearance between the top of the plug and the cover with the cover in place on the body. Sealant is then injected under pressure into a system of grooves in the surfaces of the plug and the body tapered bore which, since the plug is of tapered configuration, causes the plug to move away from metal-to-metal contact with the tapered bore to provide a space between the plug and bore into which the sealant flows to provide a sealant film between the plug and the bore.

During this movement the seal ring is deformed by movement of the plug so that a part of the ring is deformed into the let-in clearance between the top of the plug and the cover. This provides a unique stem seal which is custom fitted to the stem and cover of each individual valve, and provides a controlled clearance between the plug and body which contains a sealant film of suitable thickness by limiting the amount that the plug moves away from metal-to-metal contact with the tapered bore as will be described hereinafter in more detail.

DESCRIPTION OF THE PREFERRED EMBODIMENT

Figure 1:
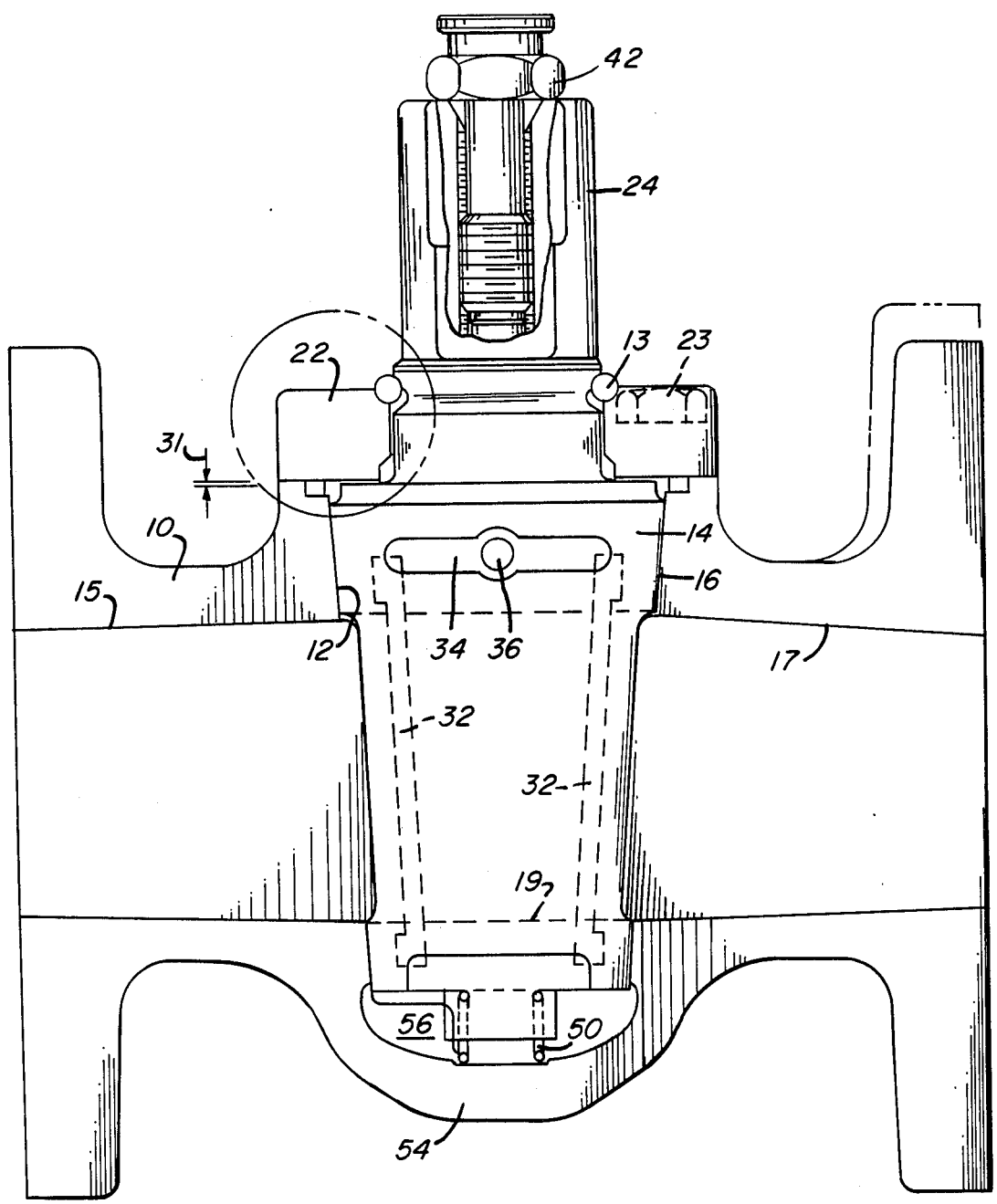
FIG. 1 shows an elevation view in cross section of a valve employing the instant invention.

Referring to the drawings, a valve body 10 encloses a chamber bounded by a tapered bore 12 on which is received a plug 14 having a similarly tapered surface 16. Inlet/outlet passages 15 and 17 in body 10 are connected by through port 19 in the plug when the plug is in its valve open position as shown in FIG. 1. The large end of the chamber is closed by a cover 22 having an opening 26 through which projects a stem 24 integrally formed on the plug, the cover being secured to the body 10 by a series of bolts 23 only one of which is shown. An elastomeric seal ring 11 is clamped between the cover 22 and body 10 and an elastomeric ring 13 is compressed between the stem 24 and cover 22 to prevent entry of moisture and foreign material into the space 30 between the stem and cover.

Figure 2:
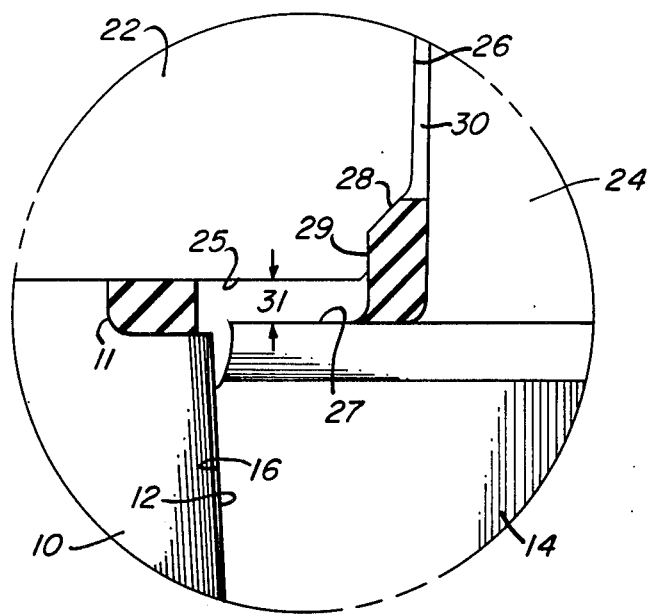
FIG. 2 is an enlarged detail of the region encircled in FIG. 1 showing the stem seal ring in partially deformed condition and with the plug in metal-to-metal contact with the body tapered bore.
Figure 3:
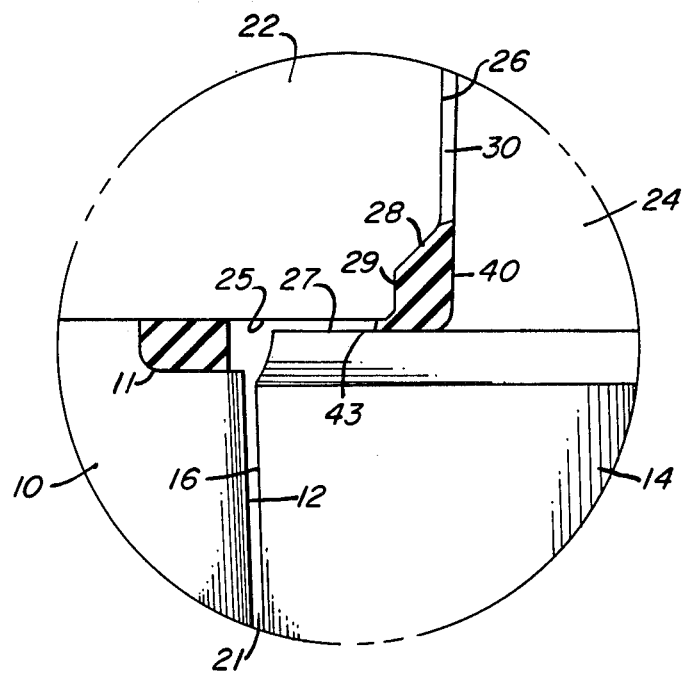
FIG. 3 is an enlarged detail of the region encircled in FIG. 1 showing the stem seal ring in fully deformed condition, and the plug "jacked" away from the body tapered bore to provide a sealant film between the plug and bore.

An annular space of substantially rectangular configuration and of substantial radial dimension is formed between the lower part of the stem 24 and the surface 29 on cover 22. The space between the top surface 27 of the plug and the bottom surface 25 of the cover when the plug is in metal-to-metal contact with the tapered bore before a sealant film is interposed between the plug and bore is identified by the numeral 31 and is commonly referred to as "let-in". The space 30 between the stem 24 and cover 22, and the space 31 as shown in FIGS. 2 and 3, and the space 21 between the plug and the tapered bore as shown in FIG. 3, are exaggerated for illustrative purposes. In a 2 inch valve, the "let-in" will typically be in the order of 0.025 inches, the space 30, 0.020 inches and in FIG. 3 the space 21 should be controlled to within a maximum value of approximately 0.0006 inches.

A bottom wall 54 at the small end of the plug forms a chamber 56 between the bottom wall 54 and the smaller end of the plug 14. A spring 50 between the wall 54 and the bottom of the plug within the annular wall biases the plug away from the tapered bore.

A sealant fitting 42 is threaded into the top of the stem 24 and communicates with an axially extending passage 38 in the stem which in turn communicates with a diametrically extending passage 36 formed at the large end of the plug. Each end of the passage 36 communicates with two circumferentially extending passages 34 (only one of which is shown) formed on diametrically opposed positions on the surface of the plug. Two pairs of grooves 32 (only one pair of which is shown) are formed in the body tapered bore 12. The upper end of each pair of the grooves 32 communicate with a corresponding circumferential groove 34 in the surface of the plug while the lower end of each pair of the grooves 32 communicate with chamber 56 at the bottom of the plug. Thus, sealant injected under pressure into the fitting 42 will flow through passages 38, 36, 34 and 32 and into the chamber 56 at the bottom of the plug. As pressure is applied to the system, the plug 14 will be forced away from metal-to-metal contact with the tapered bore 12 and sealant will flow into the space 21 between the plug and the tapered bore as best shown in FIG. 3.

During assembly the plug 14 is first inserted into the body of the plug with sufficient force to ensure metal-to-metal contact between the surface of the plug and the tapered bore 12. An annular sealing ring 40 of generally rectangular cross section in its undeformed condition is placed into the space bounded by the stem and the surface 29. The cover is then fitted to the top of the body with the stem 24 projecting through opening 26, and secured to the body by means of bolts 23. The dimensions of the cross section of the ring 40 in its undeformed rectangular condition are such that it essentially fills the space between the surface 29 and the stem, so that when the bolts 23 are fully tightened down the ring will be in contact with the surface 27 on the plug and will be slightly deformed into the let-in space 31 and into the space between surface 28 and the stem as shown in FIG. 2.

Sealant is then injected under pressure into the sealant system through the fitting 42 which forces the plug to move away from metal-to-metal contact with its bore. As the plug moves away from the tapered bore and toward surface 25, the ring 40 will be further deformed and a portion 43 (FIG. 3) will be forced into the space between the surfaces 25 and 27. The cross-section of ring 40 and the space between surface 29 and the stem are dimensioned to ensure that substantial pressure must be developed by the sealant in order to force the plug away from its seat against the resistance of deformable ring 40. The force that is developed is intended to permanently deform ring 40 so that it will not tend to return to its original shape. In a 2 inch valve the radial thickness of the ring is approximately 0.1 inch and the space between the surface 29 and the stem is just slightly larger so as to snugly receive the ring.

The plug will continue to move away from the tapered bore until sealant flows from the space 21 between the plug and tapered bore (FIG. 3) into the port 19 and/or inlet/outlets 15 and 17. At this point the pressure in the sealant system will drop drastically which will indicate to the assembler that sufficient clearance has developed between the plug and the tapered bore to allow a sealant film of proper thickness to be formed in the space 21, and that the seal ring 40 has been forced into close sealing relationship with the surfaces 25, 27, 28, 29 and the stem 24. It is by this means and procedure that the sealing ring 40 is custom fitted into each individual valve to provide a very effective stem seal while at the same time establishing a clearance between the plug and body tapered bore just sufficiently large enough for the proper sealant film thickness to enter between the plug and the bore.

The amount of pressure applied to the sealant system in order to "jack" the plug away from the tapered bore to produce clearance and form a sealant film of appropriate thickness will depend upon the radial dimension of ring 40 and the viscosity of the sealant employed. With most commonly used sealants a pressure in the order of 3400 psi is used. If a sealant of higher viscosity is used a higher "jacking" pressure may be necessary to establish the proper clearance and proper thickness of sealant film in which case a film of larger thickness may be required. In any event the point at which the proper clearance between the plug and tapered bore and the proper film thickness are reached will be signaled by a significant drop in pressure in the sealant system.

After the pressure on the sealant system has been relieved, the spring 50 will continue to urge the plug away from its seat so as to maintain sealing engagement between the ring 40 and the plug and stem. When placed in service in a pipeline the pressure of the spring will be augmented by the effect of the fluid pressure in the pipeline which exerts a thrust on the plug in a direction tending to move it away from the tapered bore, equal to the pressure of the fluid within the pipeline multiplied by the cross-sectional area of the stem. Since the axial thrust on the plug is absorbed primarily by the ring 40 and since the ring is made of PTFE which has a low coefficient of friction, resistance to rotation of the plug is minimized.

The cross-section of ring 40 is dimensioned such that the thrust from the plug generated by line fluid pressure is inconsequential as compared to the thrust at assembly generated by the sealant pressure such that further deformation of ring 40 while in service is not experienced and no enlargement of the space 21 between the plug and tapered bore takes place. If the radial dimension of the ring cross section is too great the film of sealant will be too thin causing high plug turning torque. If the radial dimension of the ring cross section is too small the ring may be further deformed by line fluid pressure allowing the plug to move too far away from the bore and causing leakage around the plug. Also, since ring 40 is permanently deformed at assembly, no forces exist which would bias the plug axially inward toward the body tapered bore and no interface pressure exists which could result in high frictional resistance between the plug and body causing the valve to be difficult to operate.

We claim:

1. Method of providing a stem seal for a tapered plug valve having a body enclosing a chamber bounded by a tapered bore, a tapered plug adapted to be received on said bore and having a stem integrally formed on and extending from the large end of said plug, a wall on said body closing the large end of said chamber and having an opening through which said stem projects, a sealant system comprised of grooves in said plug and said bore for conducting sealant to said plug and said bore, said method comprised of the steps of:

(a) inserting said plug into said bore with sufficient force to insure metal-to-metal contact between said plug and said bore, (b) providing a clearance between the large end of said plug and said wall when said plug is in metal-to-metal contact with said bore, (c) providing an annular space between said wall, said stem and the portion of the large end of said plug adjacent said stem which space communicates with said clearance, (d) providing a seal ring in said annular space of deformable material which substantially fills said annular space and extends below said wall and into contact with the large end of said plug when said plug and said bore are in metal-to-metal contact and (e) injecting sealant fluid under pressure into said system to force said plug to move away from said bore and deform a portion of said ring into the clearance between said wall and the large end of said plug.

2. The method defined in claim 1 together with the additional step of observing the pressure in said system as a means of determining when said plug has moved away from metal-to metal contact with said tapereed bore and said ring has been adequately deformed.

3. The method defined in claim 2 in which the pressure initially applied to said system is in the order of 3400 psi.

4. A tapered plug valve having a body enclosing a chamber bounded by a tapered bore, a tapered plug adapted to be received in said bore and having a stem integrally formed on and extending from the large end of said plug, a wall on said body closing the large end of said chamber and having an opening through which said stem projects, a clearance between said wall and the large end of said plug when said plug is in metal-to-metal contact with said bore, an annular space between a portion of said wall, said stem and the portion of the large end of said plug adjacent said stem, said annular space being in communication with said clearance, a seal ring of deformable material which substantially fills said annular space, means for moving said plug out of metal-to-metal contact with the bore to deform a portion of said ring into said clearance between said wall and the large end of said plug and into sealing contact with said wall and the large end of said plug adjacent said stem comprised of a system of grooves in said plug and said bore and a chamber at the small end of said plug into which sealant may be injected under pressure, resilient means at the small end of said plug biasing said plug into sealing engagement with said deformed ring.

* * * * *